S. W. McKILLOP.
DIE FRAME.
APPLICATION FILED JUNE 21, 1912.
1,058,775.
Patented Apr. 15, 1913.
4 SHEETS—SHEET 1.
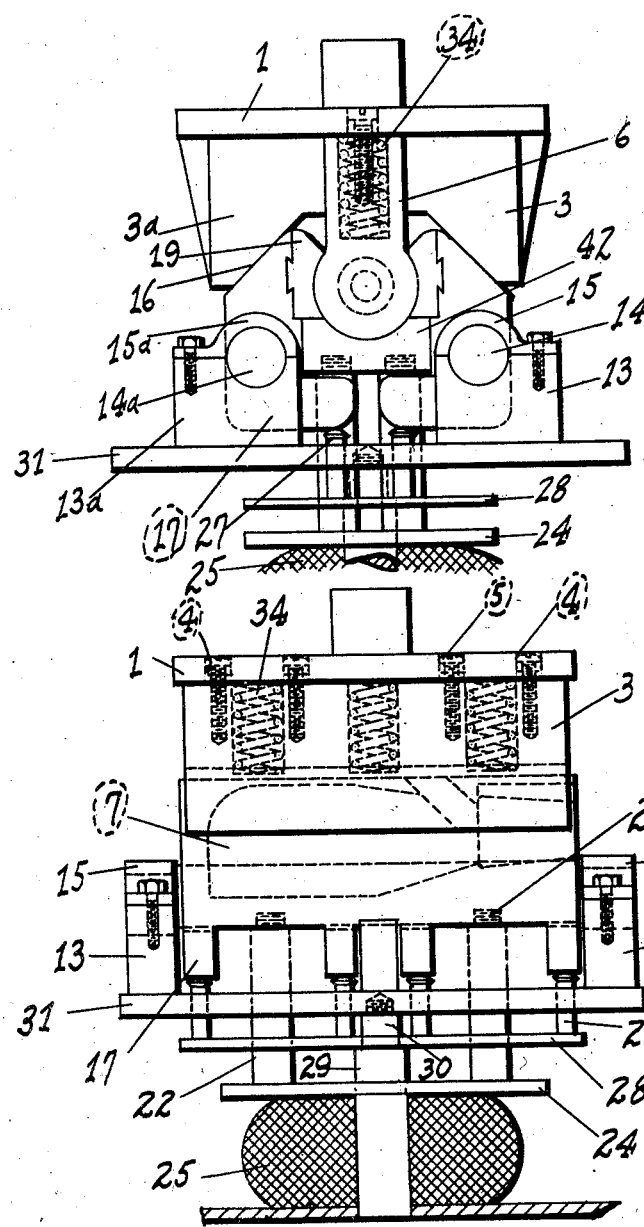
WITNESSES:
INVENTOR
Samuel W. McKillop
BY
Raymond A. Parker
ATTORNEY S. W. McKILLOP.
DIE FRAME.
APPLICATION FILED JUNE 21, 1912.

1,058,775.

Patented Apr. 15, 1913.
4 SHEETS—SHEET 2.

WITNESSES:
Paul A. R. Kroesing, jr.
Virginia C. Spratt.

INVENTOR
Samuel W. McKillop
BY
Ralzemond A. Parker
ATTORNEY

S. W. McKILLOP.
DIE FRAME.
APPLICATION FILED JUNE 21, 1912.
1,058,775.
Patented Apr. 15, 1913.
4 SHEETS—SHEET 3.
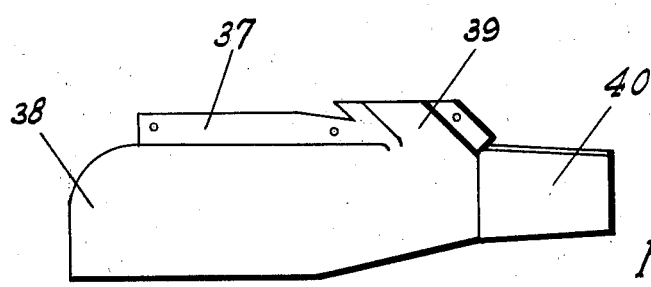
Fig. 11.
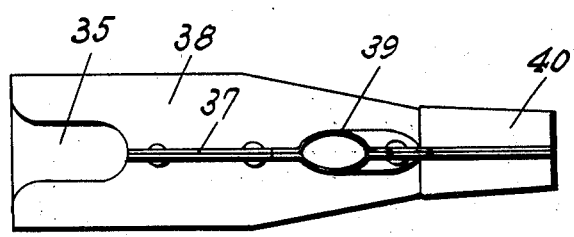
Fig. 12.
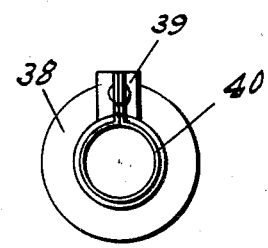
Fig. 13.
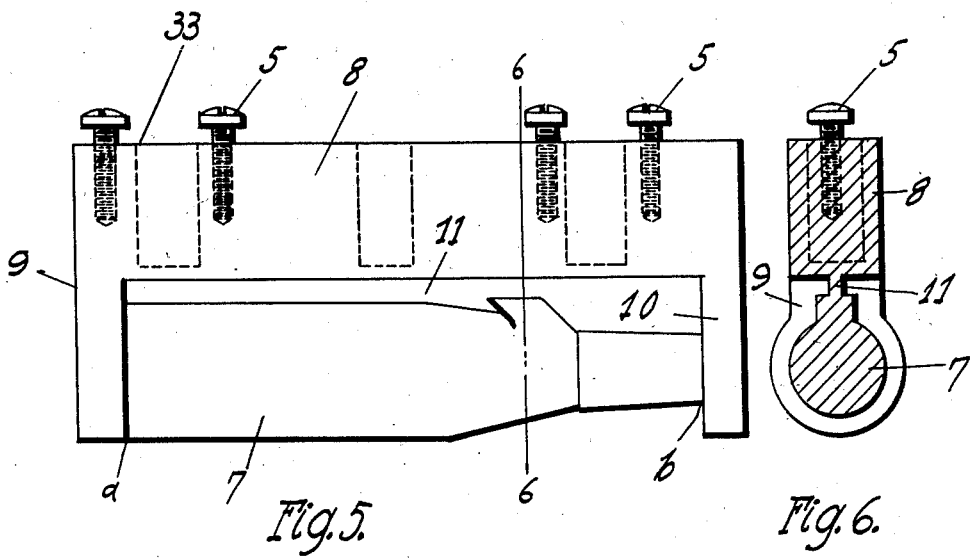
Fig. 5.
Fig. 6.
WITNESSES:
Paul A. R. Roesing jr.
Virginia C. Spratt.
INVENTOR
Samuel W. McKillop
BY
Ralgemond A. Barker
ATTORNEY S. W. McKILLOP.
DIE FRAME.
APPLICATION FILED JUNE 21, 1912.

1,058,775.

Patented Apr. 15, 1913.
4 SHEETS—SHEET 4.

WITNESSES:
Paul A. R. Kroesing, Jr.
Virginia C. Spratt.

INVENTOR
Samuel W. McKillop
BY
Ralzemond A. Parker
ATTORNEY

UNITED STATES PATENT OFFICE.

SAMUEL W. McKILLOP, OF CLEVELAND, OHIO.

DIE-FRAME.

1,058,775.

Specification of Letters Patent.   Patented Apr. 15, 1913.

Application filed June 21, 1912. Serial No. 705,021.

*To all whom it may concern:*

Be it known that I, SAMUEL W. McKILLOP, a citizen of the United States, residing at Cleveland, county of Cuyahoga, State of Ohio, have invented a certain new and useful Improvement in Die-Frames, and declare the following to be a full, clear, and exact description of the same, such as will enable others skilled in the art to which it pertains to make and use the same, reference being had to the accompanying drawings, which form a part of this specification.

This invention relates to a die frame for metal stamping machines and has for its object a die-frame adapted to stamp in one piece articles that are usually stamped in two pieces and subsequently united together.

It is more especially adapted for stamping one-piece receivers or tube-tops that are used in seeding machines or grain-drills. Some of these receivers are made to handle two kinds of seeds and these require two passages that unite and discharge through a common passage. Such an article is difficult to stamp in one piece, although it may be made without much difficulty, but by a larger and more expensive process, by two stampings and a subsequent union of the two-stamped pieces.

It is to successfully effect such single-piece stamping of such an irregular shaped article that my invention is designed.

Figure 3:
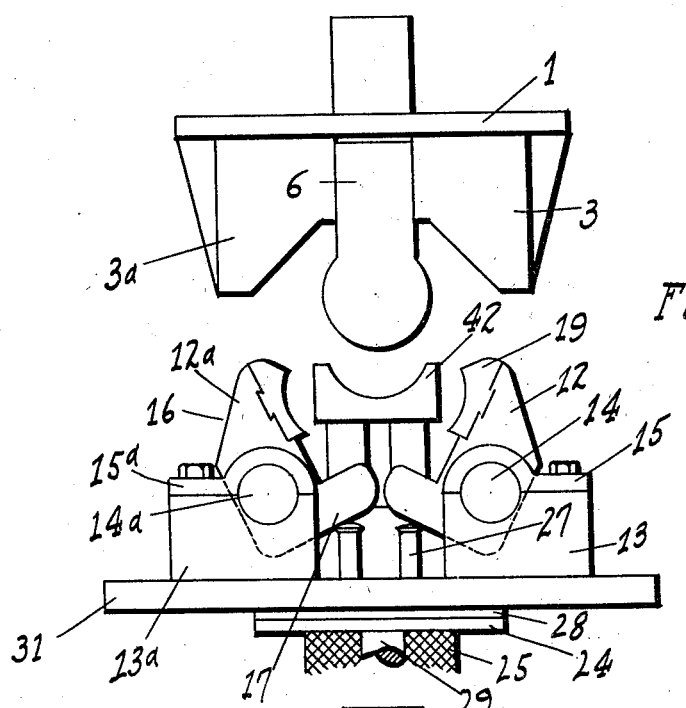
Figure 4:
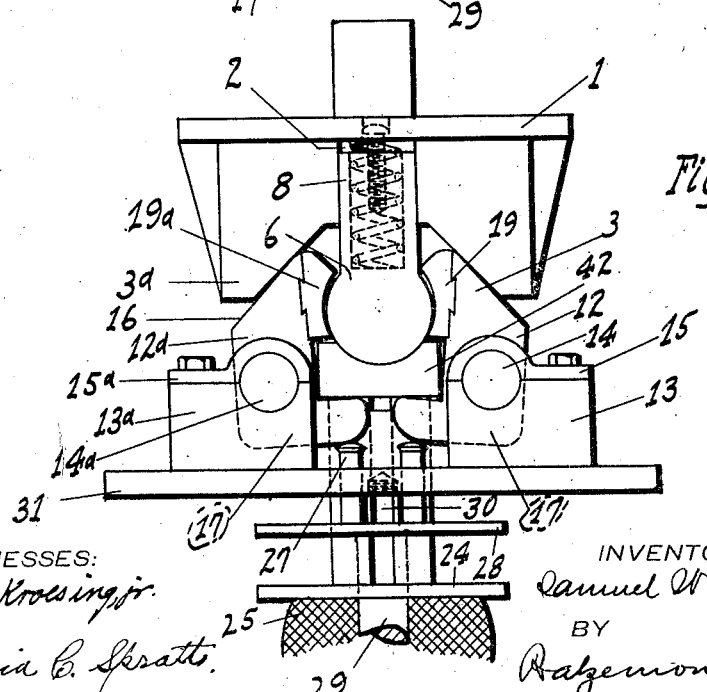
Figure 7:
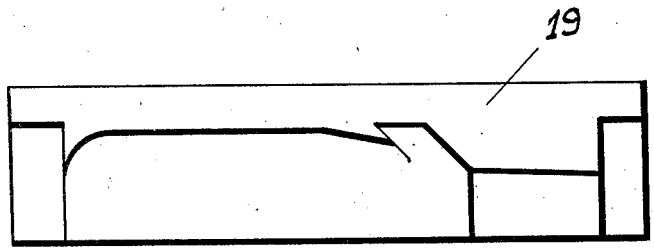
Figure 8:
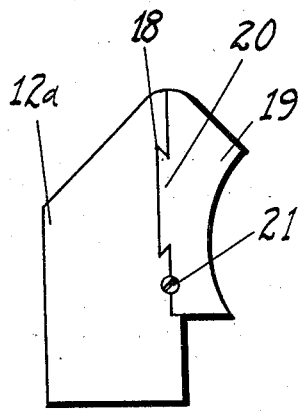
Figure 9:
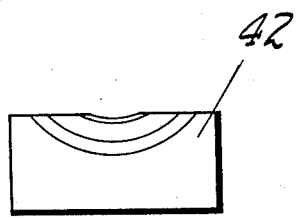
Figure 10:
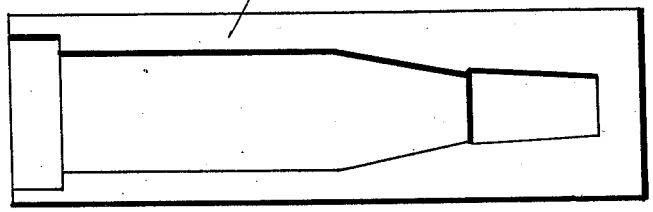

In the drawings:—Figure 1 is a front elevation of the die-frame, showing the dies closed. Fig. 2 is a side elevation of the die frame, showing the dies in the same position. Fig. 3 is a front elevation of the die-frame showing the dies open. Fig. 4 is a front elevation of the die-frame showing the dies in the act of closing. Fig. 5 is a side elevation of the punch. Fig. 6 is a section taken on the line 6—6 of Fig. 5. Fig. 7 is an elevation of the face of one of the gathering-dies. Fig. 8 is an end elevation of a part of the gathering-die carrier and of the gathering-die showing the removable connections of the die with the carrier. Fig. 9 is an end elevation of the bottom die. Fig. 10 is an elevation of a face of the bottom die. Fig. 11 is a side elevation of the product. Fig. 12 is a side elevation of the product taken upon its revolution upon its axis 90 degrees from the position shown in Fig. 11. Fig. 13 is an end elevation of the product.

1 is the punch-holder of the die-frame which may be raised or lowered by a suitable mechanical power or hand levers. This punch-holder is recessed at 2 by a recess extending through the longitudinal axis of the machine. The substance of the punch-holder depends at each side of this recess forming a pair of jaws 3 and 3ª. Along the longitudinal axis the punch-holder is drilled and a number of guide holes 4 provided. In these guide holes, the heads of the bolts 5 reciprocate vertically, giving a limited sliding connection between the punch-holder and the punch 6 which is slidable in the central recess 2 of the punch-holder.

Referring to Figs. 5 and 6, the representation in elevation of the punch is seen. In these views, the forming part of the punch and the shank are united, being cast in one piece. However, they may be two pieces fastened together, if desired. The forming part 7 is the exact counterpart of the interior of the article to be stamped. It extends from the line $a$ to the line $b$. In Fig. 5 $a$ marks the top limit of the receiver and $b$ the bottom limit. The shank of the punch consists of a longitudinal bar 8 from which at the ends extend the connecting columns 9 and 10 that are merely thickened portions of the casting at points beyond the lines $a$ and $b$. Intervening between the bar portion 8 and the forming part 7 and the columns 9 and 10 is a connecting web 11, which is comparatively thin, but which serves to strengthen the connection between the shank and the forming part. The gathering-die carriers 12 and 12ª are journaled in the pillow blocks 13 and 13ª by the trunnions 14 and 14ª and are confined to the pillow blocks by the cap plates 15 and 15ª. At the rear of the die-frame a similar pair of pillow blocks and cap plates journal similar trunnions extending from the rear of the carriers. Only the pillow block and cap plate at one side are shown and these are indicated at 13ᵇ and 15ᵇ, respectively. The gathering-die carriers are in the form of horizontal bars, that are beveled on their upper surface as at 16 and which are provided with a plurality of depending legs or rockers 17. The inside face of the carrier has a dove-tailed recess 18, (Fig. 8) while the gathering-die 19 has a dove-tailed rib 20 that engages in the dovetailed recess 18. This allows the sliding of the die into place from the end of the carrier. A screw 21 is then turned into a threaded hole formed by the carrier and the die and holds the die in place with respect to the carrier. This permits interchangeability of dies for stamping different articles.

Referring to Figs. 9 and 10, the shape of the bottom die 42 is shown. The face of the die, as shown in Fig. 10, conforms to the shape desired for that side of the receiver opposite the seam. The die is supported by the uprights 22 that are screwed into threaded holes in the bottom of the die, as shown at 23. The bottoms of these uprights abut against the plate 24 which is yieldingly forced upward by the rubber bumper 25. This bumper is compressed during the stamping operation when the punch and punch-holder descend. The legs 17 form rockers for the gathering-die carriers and these legs are engaged by the pins 27 that are attached to the plate 28. This plate 28 is stopped in its descent by the enlarged portion 29 of the vertical rod 30 that supports the bed 31 of the die frame. When the punch-holder is withdrawing, the punch opens out the gathering dies and the rubber bumper 25 forces the plate 24 upward, carrying with it the bottom die 42. The plate 24 encounters the plate 28 which thrusts the pine 27 against the rockers 17 of the gathering-die carriers and keeps them opened out as shown in Fig. 3. I do not limit myself to any particular form of yielding means for forcing these plates upward as a spring arrangement or other means could be readily supplied for the same purpose. The shank of the punch 8 is drilled with a number of cavities 33 (Fig. 5). In these cavities are the spiral springs 34, one end of a spring being attached to the punch-holder 1 and the other end to the punch 6. This gives the punch and the punch-holder a yielding connection so that in the opening of the dies, the form and form-supporter may lag behind the press as it withdraws until the gathering-die carriers can clear the jaws 3 and 3ᵃ.

The operation of the machine is as follows:—With the parts as shown in Fig. 3, the blank is inserted between the punch 6 and bottom die 42. Power is applied to cause the punch-holder 1 to descend, when the punch 6 strikes the metal and carries it into the cavity of the bottom die 42 and drives the bottom die down. The wedge-shaped jaws 3 and 3ᵃ have in the meantime engaged the beveled faces 16 of the gathering-die carriers 12 and 12ᵃ and as the press descends farther, they are rocked upon their trunnion supports and the gathering-dies 19 are caused to close in upon the metal and the punch gathering the metal as they close in. This closing-in process is clearly indicated in Fig. 4 and the final closure of the dies is shown in Fig. 1. The views shown in Figs. 1, 2, and 3 show the dies at the ends which form the large end of the receiver shown in Fig. 12. These dies do not close in over one end of the forming portion 7 of the punch, but leave a spacing at the top that is commensurate with the opening shown at 35 in Fig. 12. However, the central portion of the dies close almost completely over the top of the forming portion 7, except for the thin web 11. The punch-holder is then withdrawn upward, allowing the punch to lag behind slightly by reason of the yielding connection, so as not to compel the gathering-die carriers to open out until they can clear the wedge-shaped jaws 3 and 3ᵃ. The yielding pressure of the bumper 25 against the plate 24 serves to thrust the bottom die upward and to also strike the plate 28. The plate 28 through the pins 27 engaging against the legs or rockers 17 of the carriers, holds the carriers in open position. The receiver is then readily pulled off the punch by reason of the resilient condition of the sheet metal which allows it to spread to escape from the form, but which causes it to close back at once to its stamped form. The flanges 37 are then riveted together as shown in Fig. 11 forming a main spout 38 and an auxiliary spout 39 through which separate kinds of seeds may be fed to the distributing spout 40, from which they are conveyed into the flexible tubes that are common to most seeding machines and grain drills. The seamed side of the receiver is used as the upper side of the inclined receiver so that none of the seeds can leak through the spout for they slide on the side of the spout which has no seam.

What I claim is:—

1. A die frame, having in combination, a punch, a punch-holder having a yielding connection, and gathering dies that close in on the sides of the punch, the said yielding connection being adapted to allow the punch to lag behind the punch-holder as it withdraws to allow the gathering dies to be first opened out, substantially as described.

2. A die frame, having in combination, a punch, a punch-holder provided with a pair of beveled jaws, gathering-die carriers having beveled faces, and gathering-dies carried by the carriers, the said beveled jaws being adapted to engage the beveled faces of the gathering-die carriers and thereby cause the gathering-dies to close in on the sides of the punch, substantially as described.

3. A die frame, having in combination, a punch, a punch-holder provided with a pair of beveled jaws, a yielding connection between the punch-holder adapted to allow the punch to lag behind as the punch-holder withdraws, gathering-die carriers having beveled faces, and gathering-dies carried by the carriers, the said jaws being adapted to engage the beveled faces of the gathering-die carriers and thereby close the gathering-die over the punch, and the yielding connection adapted to allow the punch to lag behind the punch-holder until the jaws have withdrawn so the gathering-die carriers may be opened out and clear the jaws, substantially as described.

4. A die frame, having in combination, a punch, a punch-holder, a bottom die adapted to receive the punch, gathering-dies for closing in upon the sides of the punch, a resilient bumper for yieldingly forcing the bottom die upward, and connection between the resilient bumper and the gathering dies for normally keeping the dies opened out, substantially as described.

5. A die frame, having in combination, a punch, a punch-holder, a bottom die adapted to receive the punch, gathering dies adapted to close in upon the sides of the punch, gathering-die carriers provided with rockers and pivotally supported, a plate provided with uprights supporting the bottom die, a second plate provided with pins engaging the rockers of the gathering-die carriers, and means for yieldingly forcing the first-mentioned plate upward to give the bottom die a yielding support and for contacting the second-mentioned plate and keeping the dies and die carriers opened out, substantially as described.

6. In a die frame, the combination of a punch-holder having a central recess, a punch having a shank portion reciprocating in said recess and provided with cavities, and spiral springs located in said cavities and connected to the punch-holder and the punch, substantially as described.

7. In a die frame, the combination of a punch-holder provided with counter-sunk perforations and a large central recess, a punch having a shank reciprocating in said central recess and provided with cavities, bolts screwed in the shank and each having a head reciprocating in the counter-sunk perforations, and spiral springs located in said cavities of the punch and connected to the punch-holder and the punch, substantially as described.

In testimony whereof, I sign this specification in the presence of two witnesses.

SAMUEL W. McKILLOP.

Witnesses:
STUART C. BARNES,
VIRGINIA C. SPRATT.